US008150456B2

(12) United States Patent  (10) Patent No.: US 8,150,456 B2
Ke et al.  (45) Date of Patent: Apr. 3, 2012

(54) MOBILE PHONE WITH CAMERA

(75) Inventors: Po-Jen Ke, Taipei (TW); Shiao-Feng Li, Taipei (TW); Hung-Chang Hung, Taipei (TW)

(73) Assignee: ASUSTek Computer Inc., Taipei (JP)

( * ) Notice: Subject to any disclaimer, the term of this patent is extended or adjusted under 35 U.S.C. 154(b) by 648 days.

(21) Appl. No.: 12/333,384

(22) Filed: Dec. 12, 2008

(65) Prior Publication Data

US 2009/0176527 A1 Jul. 9, 2009

(30) Foreign Application Priority Data

Jan. 9, 2008 (TW) ................................ 97100873 A

(51) Int. Cl.
*H04M 1/00* (2006.01)
(52) U.S. Cl. ................ 455/556.1; 455/557.4; 455/557.1
(58) Field of Classification Search ............... 455/556.1, 455/575.4, 575.1; 312/334.6; 248/274.1
See application file for complete search history.

(56) References Cited

U.S. PATENT DOCUMENTS

2007/0222348 A1* 9/2007 Kobayashi ................. 312/334.6
2009/0159767 A1* 6/2009 Ko ............................ 248/274.1

FOREIGN PATENT DOCUMENTS

CN 101005523 7/2007

OTHER PUBLICATIONS

English language translation of abstract of CN 101005523 (published Jul. 25, 2007).

* cited by examiner

*Primary Examiner* — Jean B Jeanglaude
(74) *Attorney, Agent, or Firm* — Thomas, Kayden, Horstemeyer & Risley, LLP

(57) ABSTRACT

A mobile phone with camera includes a body, a display module, two support arms and a camera. The body has a first surface and a second surface. The first surface is perpendicular to the second surface, and the first surface has a concave section, which has two parallel sliding slots on two opposite sidewalls thereof. Each of the support arms has one end pivotally connected with the first surface and the other end pivotally connected with the display module such that the display module can be rotated relative to the body and slid along the two parallel sliding slots so as to have the display module selectively laid against the first surface or form an angle between the display module and the second surface. The camera is disposed on the second surface for snapping images to be displayed on the display module.

8 Claims, 3 Drawing Sheets

MOBILE PHONE WITH CAMERA

RELATED APPLICATIONS

This application claims priority to Taiwan Application Serial Number 97100873, both filed Jan. 9, 2008, which are herein incorporated by reference.

BACKGROUND

1. Field of Invention

The present invention relates to a mobile phone. More particularly, the present invention relates to a mobile phone with a camera.

2. Description of Related Art

A conventional mobile phone with a camera function usually has its display screen and camera module located on the same side or two opposite sides of its body. The camera module cannot be located on the remaining sides of the body other than what is mentioned in last sentence. Therefore, there is a need for improving the design of the mobile phone with a camera.

SUMMARY

It is therefore an objective of the present invention to provide a mobile phone with a camera.

In accordance with the foregoing and other objectives of the present invention, a mobile phone includes a body, a display module, two support arms and a camera. The body has a first surface and a second surface. The first surface is perpendicular to the second surface, and the first surface has a concave section, which has two parallel sliding slots on two opposite sidewalls thereof. Each of the support arms has one end pivotally connected with the first surface and the other end pivotally connected with one of the two parallel edges of the display module such that the two support arms enable the display module to rotate relative to the body and slide along the two parallel sliding slots so as to have the display module selectively laid against the first surface or form an angle between the display module and the second surface. The camera is disposed on the second surface for snapping images to be displayed on the display module.

Thus, the present invention provides a mobile phone, which is equipped with a rotated display module to be laid against or stood upright on the body, to both satisfy a general demand and a photo-snapping demand thereof.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
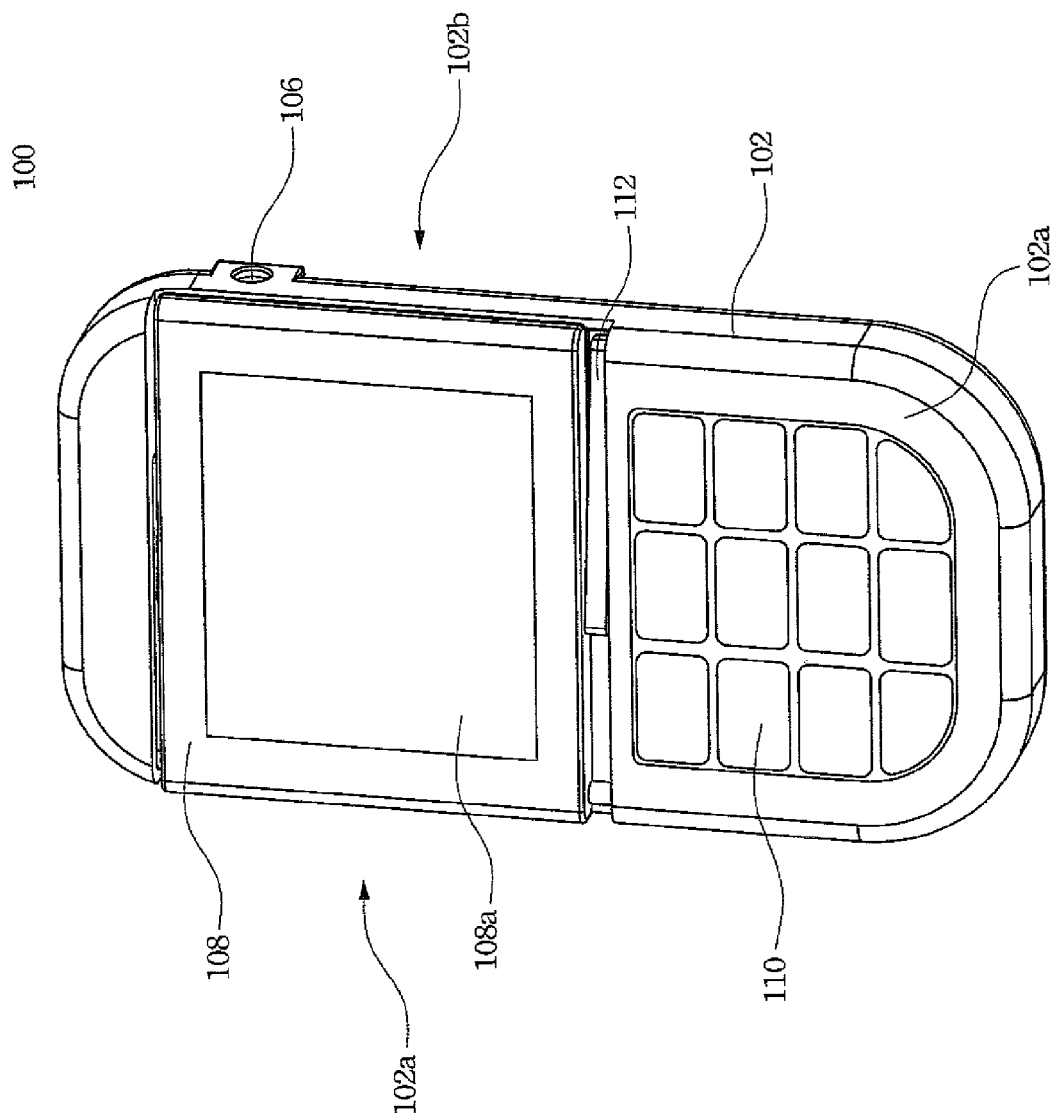
FIG. 1 illustrates a mobile phone with a camera according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a mobile phone with a camera according to one preferred embodiment of this invention. The mobile phone 100 includes a body 102, which is substantially a rectangular parallelepiped, and a display module 108. The body 102 has a surface 102a, which is equipped with a keyboard 110. The surface 102a is one of the largest pair (with largest area or size) of three pairs of parallel surfaces of the body 102. The display module 108 includes a display screen 108a. When the display module 108 is fully laid against the surface 102a, the display screen 108a is exposed for outputting information. In this embodiment, the camera 106 is located on a surface 102b, which is adjacent and perpendicular to the surface 102a. The camera 106 may be located on the remaining three surfaces, which are adjacent and perpendicular to the surface 102a. What is snapped by the camera 106 can be displayed on the display screen 108a of the display module 108.

Figure 2:
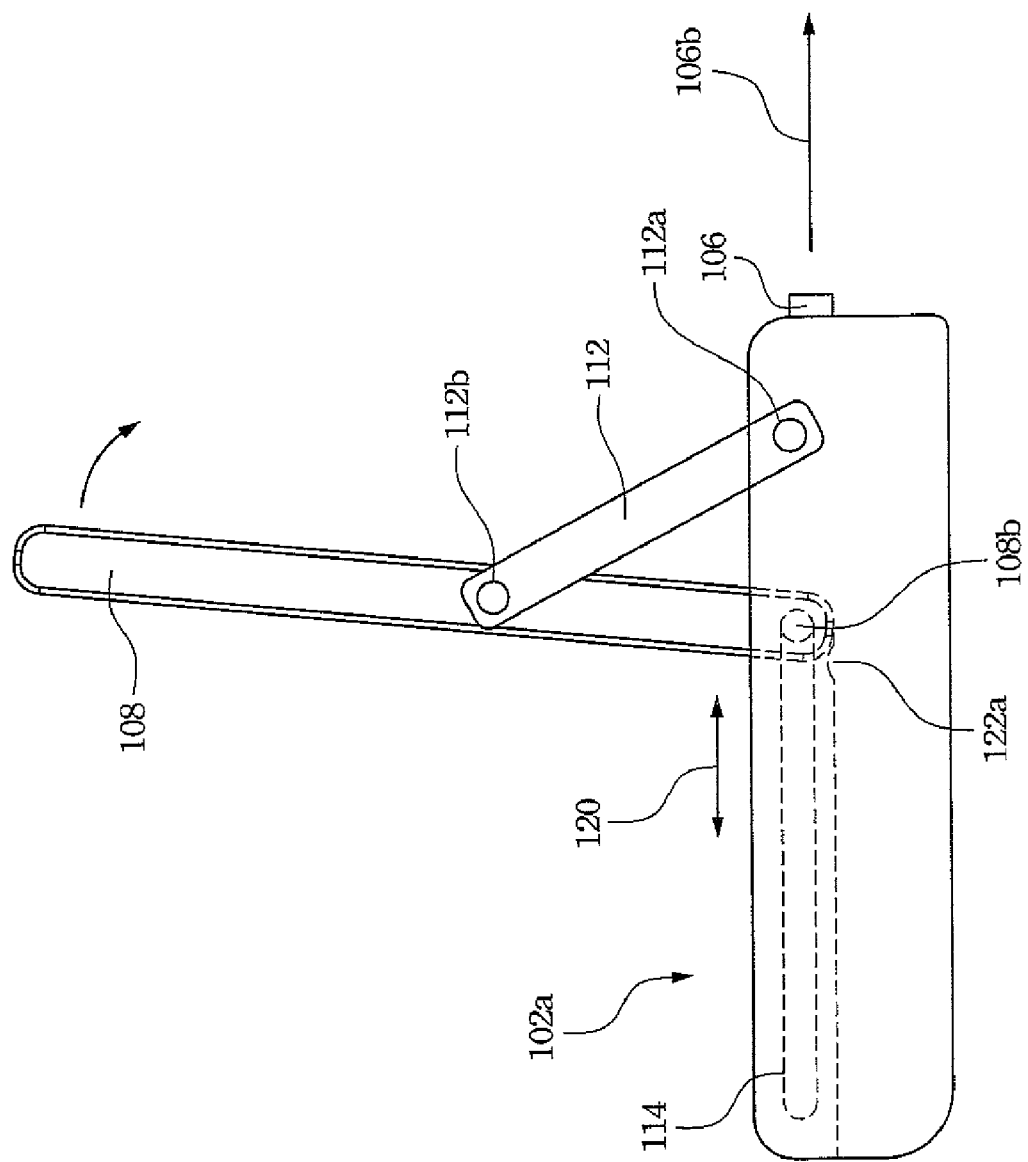
FIG. 2 illustrates a side view of a mobile phone with its display module standing upright according to one preferred embodiment of this invention.

FIG. 2 illustrates a side view of a mobile phone with its display module standing upright according to one preferred embodiment of this invention. When the mobile phone 100 is in normal operation, i.e. making a phone call, the display module only to be laid against the body 102 (as illustrated in FIG. 1). When the camera 106 is enabled, the display module 108 needs to be stood upright such that the display screen 108a can be seen by the user when the camera 106 is focused on a desired object. The display module 108 can be rotated relative to the body 102 because a sliding rib 108b engages within a sliding slot 114 of the body 102 and two support arms 112 pivotally interconnect the display module 108 and the body 102. Each of the two support arms 112 has one end pivotally connected with one of two parallel edges (at a middle section of each edge rather than two opposite ends of the each edge) of the display module 108 and the opposite end pivotally connected with the surface 102a of the body 102. When the display module 108 slides along the direction 120, the display module 108 can be selectively laid against the surface 102a (as illustrated in FIG. 1) or form an angle between the display module 108 and the body 102 (as illustrated in FIG. 2). When the display module 108 in the position illustrated in FIG. 2, a bottom edge of the display module 108 is secured by a positioning portion (such as a convex section 122a) in the concave section 122. In this embodiment, the direction 120 is in parallel with a direction 106b, which the camera 106 snaps images along.

Figure 3:
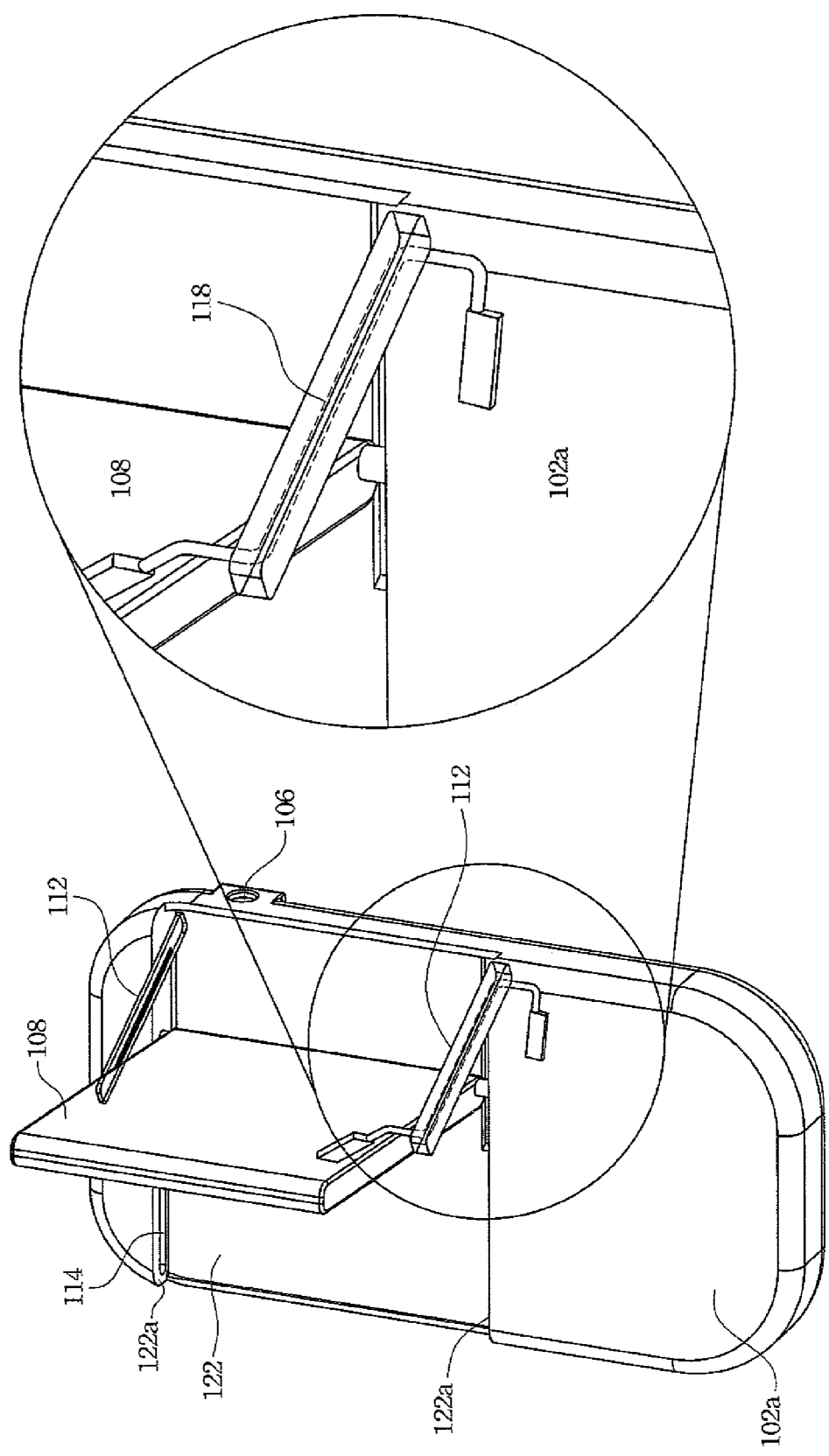
FIG. 3 illustrates a different view of the mobile phone in FIG. 2.

FIG. 3 illustrates a different view of the mobile phone in FIG. 2. In this embodiment, two sliding ribs 108b of the display module 108 respectively engage within two parallel sliding slots 114 on two opposite sidewalls 122a within the concave section 122. The concave section 122 is on the surface 102a of the body 102. In order to electrically interconnect the display module 108 and the body 102, an electrically conductive wire 118 is disposed within one of two support arms 112 to achieve such purpose (see enlarged view in FIG. 3).

According to discussed embodiments, the present invention provides a mobile phone, which is equipped with a rotated display module to be laid against or stood upright on the body, to both satisfy a general demand and a photo-snapping demand thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile phone with camera, comprising:
   a body having a first surface and a second surface, the first surface being perpendicular to the second surface, the first surface having a concave section, the concave section having two parallel sliding slots on two opposite sidewalls thereof;
   a display module having two parallel edges;
   two support arms, each of the support arms having one end pivotally connected with the first surface and the other end pivotally connected with one of the two parallel edges of the display module such that the two support arms enable the display module to rotate relative to the body and slide along the two parallel sliding slots so as to have the display module selectively laid against the first surface or form an angle between the display module and the second surface; and
   a camera disposed on the second surface for snapping images to be displayed on the display module.

2. The mobile phone of claim 1, wherein the body comprises a keyboard on the first surface of the body.

3. The mobile phone of claim 1, wherein one side of the display module slides on the first surface, the direction of the display module sliding is parallel to the direction of the camera snapping images.

4. The mobile phone of claim 1, wherein the concave section comprises a positioning portion to fasten the display module.

5. The mobile phone of claim 4, wherein the positioning portion is a convex section.

6. The mobile phone of claim 1, further comprising an electrically conductive wire disposed within one of the two support arms.

7. The mobile phone of claim 1, wherein the connection points, where the support arms being pivotally connected with the display module, is not located at two ends of either one of the two parallel edges.

8. The mobile phone of claim 1, wherein the display module has a display screen, when the display module is laid against the first surface, the display screen is exposed.

* * * * *